US006826193B1

(12) United States Patent
Peisa

(10) Patent No.: US 6,826,193 B1
(45) Date of Patent: Nov. 30, 2004

(54) DATA TRANSMISSION IN A TELECOMMUNICATIONS NETWORK

(75) Inventor: Janne Peisa, Helsinki (FI)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 782 days.

(21) Appl. No.: 09/693,899

(22) Filed: Oct. 23, 2000

(30) Foreign Application Priority Data

Oct. 28, 1999 (FI) ................................................ 9925376

(51) Int. Cl.⁷ ................................................ H04J 3/16
(52) U.S. Cl. ...................................... 370/437; 370/329
(58) Field of Search ................................. 370/229, 230, 370/235, 310, 315, 329, 342, 431, 437, 441, 458

(56) References Cited

U.S. PATENT DOCUMENTS 5,864,536 A * 1/1999 Foglar ......................... 370/232
6,229,795 B1 * 5/2001 Pankaj et al. ................ 370/329

FOREIGN PATENT DOCUMENTS

| EP | 0 991 218 A2 | 4/2000 | |
|---|---|---|---|
| WO | 99/66736 | 12/1999 | |
| WO | WO 00/28760 | * 5/2000 | H04Q/7/38 |

OTHER PUBLICATIONS

Arad et al, "A Generalized Processor Sharing Approach to Time Scheduling in Hybrid CDMA/TDMA", San Francisco, CA, Mar. 29–Apr. 2, 1998, New York, NY, IEEE, Mar. 29, 1998, pp. 1164–1171.

"3rd Generation Partnership Project; Technical Specification Group, Radio Access Network, Radio Interface Protocol Architecture" (3G TS 25.301 version 3.3.0), ETSI, Dec. 1999.

"Universal Mobile Telecommunications System (UMTS); MAC Protocol Specification", (3G TS 25.321 version 3.2.0 release 1999), ETSI, Jan. 2000.

* cited by examiner

Primary Examiner—Alpus H. Hsu
Assistant Examiner—Jason Mattis
(74) Attorney, Agent, or Firm—Nixon & Vanderhye P.C.

(57) ABSTRACT

A method of allocating transmission resources at a Media Access Control (MAC) entity of a node of a Universal Mobile Telecommunications System (UMTS). The method comprises, for each frame of an output data flow, computing for each input flow to the MAC entity a fair share of the available output bandwidth of the MAC entity. A Transport Format Combination (TFC) is then identified from a TFC Set (TFCS) on the basis of the bandwidth shares computed for the flows, where the TFC comprises a Transport Format allocated to each input flow. For each input flow, if the allocated TF results in a data transmission rate which is less than the determined fair distribution, the difference is added to a backlog counter for the input flow. The value of the backlog counters is taken into account when selecting a TFC for the subsequent frame of the output data flow.

11 Claims, 2 Drawing Sheets

DATA TRANSMISSION IN A TELECOMMUNICATIONS NETWORK

FIELD OF THE INVENTION

The present invention relates to data transmission in a telecommunications network and in particular, though not necessarily, to data transmission in a Universal Mobile Telecommunications System (UMTS).

BACKGROUND TO THE INVENTION

The European Telecommunications Standardisation Institute (ETSI) is currently in the process of standardising a new set of protocols for mobile telecommunications systems. The set of protocols is known collectively as the Universal Mobile Telecommunications System (UMTS). FIG. 1 illustrates a simplified UMTS layer 2 protocol structure which is involved in the communication between mobile stations (e.g. mobile telephones) and Radio Network Controllers (RNCs) of a UMTS network. The RNCs are analogous to the Base Station Controllers (BSCs) of existing GSM mobile telecommunications networks, communicating with the mobile stations via Base Transceiver Stations (BTS).

The layer 2 structure of FIG. 1 consists of a set of Radio Access Bearers (RABs) which make available radio resources (and services) to user applications. For each mobile station there may be one or several RABs. Data flows (in the form of segments) from the RABs are passed to respective Radio Link Control (RLC) entities which amongst other tasks buffer the received data segments. There is one RLC entity for each RAB. In the RLC layer, RABs are mapped onto respective logical channels. A Medium Access Control (MAC) entity receives data transmitted in the logical channels and further maps logical channels onto a set of transport channels. Transport channels are finally mapped to a single physical transport channel which has a total bandwidth (<2Mbits/sec) allocated to it by the network. Depending whether a physical channel is used exclusively by one mobile station or is shared between many mobile stations, it is referred to as either a "dedicated physical channel" or a "common channel". A MAC entity connected to a dedicated physical channel is known as MAC-d, there being one MAC-d entity for each mobile station. A MAC entity connected to a common channel is known as MAC-c. There is one MAC-c entity for each cell.

The bandwidth of a transport channel is not directly restricted by the capabilities of the physical layer, but is rather configured by a Radio Resource Controller (RRC) entity using Transport Formats. For each transport channel the RRC entity defines one or several Transport Block (TB) sizes. Each Transport Block size directly corresponds to an allowed MAC Protocol Data Unit (PDU) and tells the MAC entity what packet sizes it can use to transmit data to the physical layer. In addition to block size, the RRC entity informs the MAC entity of a Transport Block Set (TBS) size, which is the total number of bits the MAC entity can transmit to the physical layer in single transmission time interval (TTI). The TB size and TBS size, together with some additional information relating to the allowed physical layer configuration, form a Transport Format (TF). An example of a TF could be (TB=80 bits, TBS=160 bits) meaning that the MAC entity can transmit two 80 bit packets in single transmission time interval. Thus the TF can be written as TF=(80,160).

The RRC entity also informs the MAC entity of all possible TFs for a given transport channel. This combination of TFs is called a Transport Format Combination (TFC). An example of a TFC is {TF1=(80, 80), TF2=(80, 160)}. In this example the MAC entity can choose to transmit one or two PDUs in one TTI on the particular transport channel in question. In both cases the PDUs will have a size of 80 bits.

In each TTI, the MAC entity has to decide how much data to transmit on each transport channel connected to it. These transport channels are not independent of one another, and are later multiplexed onto a single physical channel at the physical layer (as discussed above). The RRC entity has to ensure that the total transmission capability on all transport channels does not exceed the transmission capability of the underlying physical channel. This is done by giving the MAC entity a Transport Format Combination Set (TFCS), which contains the allowed Transport Format Combinations for all transport channels. By way of example, consider a MAC entity which has two transport channels which are further multiplexed onto a single physical channel which has a transport capacity of 160 bits per transmission time interval (NB. in practice, the capacity will be much greater than 160). The RRC could decide to assign three transport formats TF1=(80, 0), TF2=(80, 80) and TF3=(80, 160) to both transport channels. Clearly however, the MAC entity cannot choose to transmit on both transport channels at the same time using TF3 as this would result in the need to transmit 320 bits on the physical channel which has only a capability to transmit 160 bits. The RRC entity has to restrict the total transmission rate by not allowing all combinations of the TFs. An example of this would be a TFCS as follows [{(80, 0), (80, 0)}, {(80, 0), (80, 80)}, {(80, 0), (80, 160)}, {(80, 80), (80, 0)}, {(80, 80), (80, 80)}, {(80, 0)}], where the transport format of transport channel 1 is given as the first element of each element pair, and the transport format of transport channel 2 is given as the second element. As the MAC entity can only choose one of these allowed transport format combinations from the transport format combination set, it is not possible to exceed the capability of the physical channel.

An element of the TFCS is pointed out by a Transport Format Combination Indicator (TFCI), which is the index of the corresponding TFC. For example, in the previous example there are 6 different TFCs, meaning that the TFCI can take any value between 1 and 6. The TFCI=2 would correspond to the second TFC, which is {(80, 0), (80, 80)}, meaning that nothing is transmitted from the first transport channel and a single packet of 80 bits is transmitted from the second transport channel.

It is of course necessary to share the total available bandwidth between the logical channels. The decision to distribute the bandwidth to different transport channels is made by the MAC entity for each transmission time interval by choosing a suitable TFCI. This sharing of bandwidth can be done in several ways, for example by giving an absolute preference to flows which are considered to be more important than others. This would be the easiest method to implement, but can result in a very unfair distribution of the bandwidth. Specifically, it is possible that flows that have lower priorities are not allowed to transmit for a prolonged period of time. This can result in extremely poor performance if the flow control mechanism of a lower priority flow reacts to this. A typical example of such a flow control mechanism can be found in the TCP protocol used in the Internet.

In existing technologies, such as IP and ATM networks, provision is made for allocating resources on a single output channel, to multiple input flows. However, the algorithms used to share out the resources in such systems are not directly applicable to UMTS where multiple input flows are transmitted on respective logical output channels.

A proposal for sharing resources between multiple input data flows has been made and is referred to as Generalised Processor Sharing (GPS). This proposal, when employed in systems having only a single output channel, is known as Weighted Fair Queuing (WFQ) and is described in a paper entitled "A Generalised Processor Sharing Approach to Flow Control in Integrated Services Networks: The Single Node Case", A. K. Parekh, R. G. Gallager, published in IEEE/ACM Transactions On Networking, Vol. 1, no. 3, June 1993, pp344–357. Stated simply, GPS involves calculating a GPS weight for each input flow on the basis of certain parameters associated with the flow. The weights calculated for of all of the input flows are added together, and the total available output bandwidth is divided amongst the input flows depending upon the weight of each flow as a fraction of the total weight. GPS could be applied to the MAC entity in UMTS, with the weighting for each input flow being determined (by the RRC entity) on the basis of certain RAB parameters which are allocated to the corresponding RAB by the network. In particular, a RAB parameter may equate to a Quality of Service (QoS) or Guaranteed rate allocated to a user for a particular network service.

Statement of the Invention

The inventor of the present invention has realised that there are difficulties involved in applying GPS directly to bandwidth allocation in a UMTS network, as GPS assumes that data can be sent on the MAC entity logical channels in infinitely small blocks. This is not possible in UMTS, as UMTS relies upon Transport Format Combinations Sets (TFCSs) as the basic mechanism defining how much data can be sent in each transmission time interval. If GPS is to be employed in UMTS, it is necessary to select the TFC (from the TFCS) which most closely matches the bandwidth allocated to an input flow by GPS. The result of this approach is that the actual amount of data sent for an input stream in a given frame may fall below the optimised rate or may exceed that optimised rate. In the former case, a backlog of unsent data may build up for the input flow.

It is an object of the present invention to overcome or at least mitigate the disadvantage noted in the proceeding paragraph. This and other objects are achieved at least in part by maintaining a backlog counter which keeps track of the backlog of unsent data for a given input flow to the MAC entity. The backlog is taken into account when determining an appropriate TFC for that input flow for a subsequent frame.

According to a first aspect of the present invention there is provided a method of allocating transmission resources at a Media Access Control (MAC) entity of a node of a Universal Mobile Telecommunications System (UMTS), the method comprising for each frame of an output data flow:

computing for each input flow to the MAC entity a fair share of the available output bandwidth of the MAC entity;

selecting a Transport Format Combination (TFC) from a TFC Set (TFCS) on the basis of the bandwidth share computed for the input flows, where the TFC comprises a Transport Format allocated to each input flow; and for each input flow, if the allocated TF results in a data transmission rate which is less than the determined fair distribution, adding the difference to a backlog counter for the input flow, wherein the value of said backlog counters is taken into account when selecting a TFC for the subsequent frame of the output data flow.

Embodiments of the present invention allow the TFC selection process for a subsequent frame to take into account any backlogs which exists for the input flows. The tendency is to adjust the selected TFC to reduce the backlogs. Such a backlog may exist due to the finite number of data transmission possibilities provided for by the TFCS Nodes at which the method of the present invention may be employed include mobile stations (such as mobile telephones and communicator type devices) and Radio Network Controllers (RNCs).

Preferably, the input flows to the MAC entity are provided by respective Radio Link Control (RLC) entities. More preferably, each RLC entity provides buffering for the associated data flow.

Preferably, the step of computing a fair share of resources for an input flow is carried out by a Radio Resource Control (RRC) entity.

Preferably, the step of computing a fair share of resources for an input flow comprises determining the weighting given to that flow as a fraction of the sum of the weights given to all of the input flows. The fair share is then determined by multiplying the total output bandwidth by the determined fraction. More preferably, this step involves using the Generalised Processor Sharing (GPS) mechanism. The weighting for a data flow may be defined by one or more Radio Access Bearer (RAB) parameters allocated to a Radio Access Bearer by the UMTS network, where a RAB is associated with each MAC input flow.

Preferably, in the event that the backlog counter for a given input flow has a positive value, the method comprises adding the value of the backlog counter to the computed fair share for that flow, and selecting a TFC on the basis of the resulting sums for all of the input flows.

In certain embodiments of the present invention, where, for a given input flow, the allocated TF results in a data transmission rate which is more than the determined fair distribution, the difference may be subtracted from the backlog counter for the input flow.

According to a second aspect of the present invention there is provided a node of a Universal Mobile Telecommunications System (UMTS), the node comprising:

a Media Access Control (MAC) entity for receiving a plurality of input data flows;

first processor means for computing for each input flow to the MAC entity a fair share of the available output bandwidth of the MAC entity and for selecting a Transport Format Combination (TFC), from a TFC Set (TFCS), on the basis of the bandwidth share computed for the input flows, where the TFC comprises a Transport Format allocated to each input flow;

second processor means for adding to a backlog counter associated with each input flow, the difference between the data transmission rate for the flow resulting from the selected TFC and the determined fair share, if the data transmission rate is less than the determined fair share, said first processor means being arranged to take into account the value of said backlog counters when selecting a TFC for the subsequent frame of the output data flow.

Preferably, said first and second processor means are provided by a Radio Resource Control (RRC) entity.

DETAILED DESCRIPTION OF A PREFERRED EMBODIMENT

Figure 1:
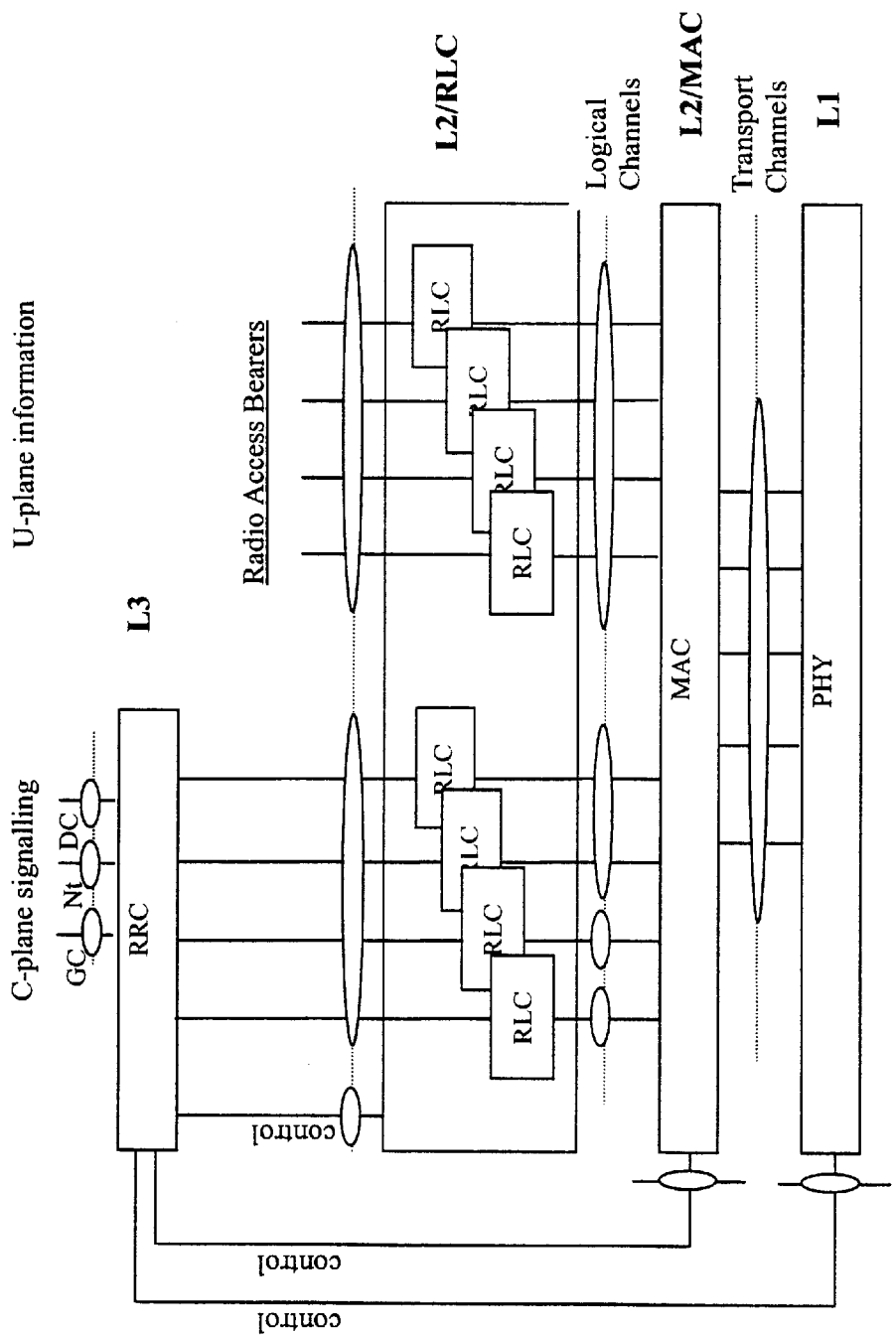
FIG. 1 illustrates schematically the layer 2 of a UMTS.

As has already been described above, a simplified UMTS layer 2 consists of one Radio Resource Control (RRC) entity, a Medium Access Control (MAC) entity for each mobile station, and a Radio Link Control (RLC) entity for each Radio Access Bearer (RAB). The MAC entity performs scheduling of outgoing data packets, while the RLC entities provide buffers for respective input flows. The RRC entity sets a limit on the maximum amount of data that can be transmitted from each flow by assigning a set of allowed Transport Format Combinations (TFC) to each MAC (referred to as a TFC Set or TFCS), but each MAC must independently decide how much data is transmitted from each flow by choosing the best available Transport Format Combination (TFC) from the TFCS.

The proposed method works by calculating at the MAC entity, (on a per Transmission Time Interval basis) the optimal distribution of available bandwidth using the Generalised Processor Sharing GPS approach (see the article by A. K. Parekh et al referenced above) and keeping track of how far behind each flow is from the optimal bandwidth allocation using respective backlog counters. The available bandwidth is distributed to flows by using the standard GPS weights, which must be calculated by the RRC using the RAB parameters.

The method first calculates the GPS distribution for the input flows and adds to the GPS values the current respective backlogs. This is done once for each 10 ms TTI and results in a fair transmission rate for each flow. However, this rate may not be optimal as it may happen that there is not enough data to be sent in all buffers. In order to achieve optimal throughput as well as fairness, the fair GPS distribution is reduced to not exceed the current buffer fill level or the maximum allowed rate for any logical channel. A two step rating process is then carried out.

First, the set of fair rates computed for all of the input flows is compared against possible Transport Format Combinations (TFCs) in turn, with each TFC being scored according to how close it comes to sending out the optimal rate. In practice this is done by simply by counting how much of the fair configuration a TFC fails to send (if a given TFC can send all packets at the fair rate, it is given a score of zero) and then considering only the TFCs which have the lowest scores. The closest match is chosen and used to determine the amount of packets sent from each queue. TFCs having an equal score are given a bonus score according to how many extra bits they can send (this can be further weighted by a Quality of Service rating in order to ensure that the excess capacity goes to the bearer with the highest quality class).

The final selection is based on two level scoring: the TFC with the lowest score is taken. If there are several TFCs with an equal score, the one with the highest bonus score is chosen. This ensures that the rate for each TTI is maximised. Fairness is achieved by checking that if the chosen TFC does not give all flows at least their determined fair rate, the missing bits are added to a backlog counter of the corresponding flow and the selection is repeated for the next TTI. If any of the flows has nothing to transmit, the backlog is set to zero.

This algorithm can be shown to provide bandwidth (and under certain assumptions delay bounds) which is close to that of GPS. However, it remains fair and maintains isolation between all flows. It is also computationally simpler than Weighted Fair Queuing algorithms because it utilises the fact that the MAC layer can transmit on several transport channels at the same time. This should result in close to optimal utilisation of the radio interface in the UMTS radio link.

Figure 2:
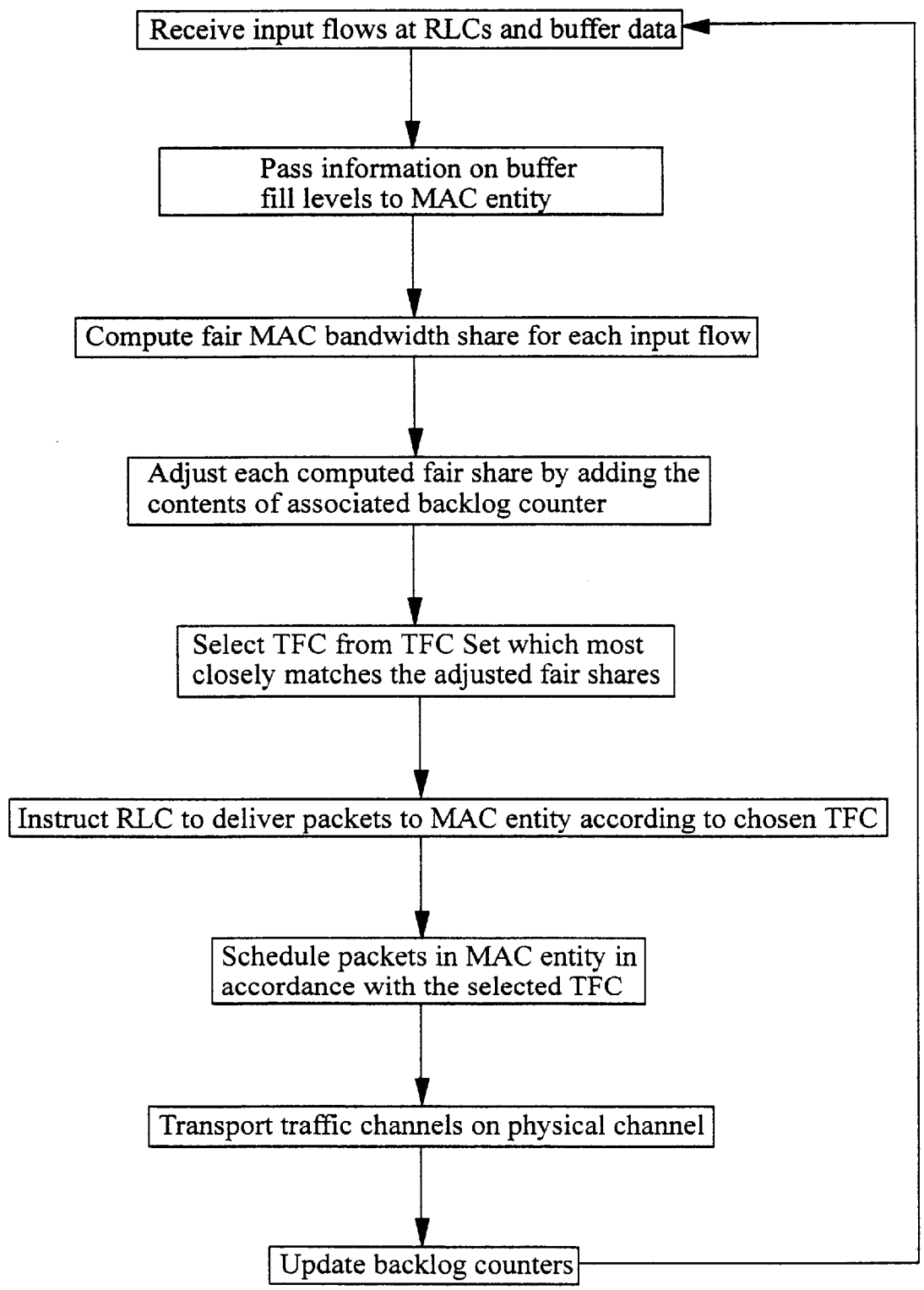
FIG. 2 is a flow diagram illustrating a method of allocating bandwidth resources to the input flow streams of a MAC entity of the layer 2 of FIG. 1.

FIG. 2 is a flow diagram further illustrating the method described above.

The following is an outline algorithm for implementing the preferred embodiment.

```
/*
 * GPS based TFC selection. Schedules packets by optimising the
throughput
 * while still keeping the fairness (i.e. guaranteed rates) .
 */
int sched_gps( ) {
    double weight, weight_sum;
    double score, bonus_score;
    double min_score = HUGE_NUMBER;
    double max_bonus_score = 0;
    int maxrate;
    int i, j;
    int tfc, tfci, qf, rate, trch;
    int tfc_to_use;
    double backlog[MAX_TRCH] ;
    double gps_req[MAX_TRCH] ;
    double gps_req_comp[MAX_TRCH] ;
    /* First calculate the sum of the weights of all active queues */
    weight_sum=0;
    for(trch = 0; trch < MAX_TRCH; trch++) {
        if (queue_fill_state[trch] > 0) {
            weight_sum += weight_vector[trch] ;
        }
    }
    /* Then calculate the fair distribution of available bandwidth
     * using GPS. Modify the GPS scheduling reducing the rate if there
     * is not enough data in the buffers or if the scheduled rate is
     * higher that the maximum rate for a given logical channel
     */
    int gps_rate=0;
    for(trch = 0; trch < MAX_TRCH; trch++) {
        if(queue_fill_state[trch] == 0) {
            backlog[trch] = 0;
        }
        // here we calculate how many bits we should send on each
channel
        // by GPS
        gps_req[trch] = 0;
        gps_req_comp[trch] = 0;
        if(queue_fill_state[trch] > 0) {
            weight = weight_vector[trch] ;
            gps_req[trch] = weight / weight_sum * maxrate + backlog[trch] ;
            gps_req_comp[trch] = gps_req[trch] ;
            if (gps_req_comp[trch] > queue_fill_state[trch]) {
                gps_req_comp[trch] = queue_fill_state[trch] ;
            }
            if (gps_req_comp[trch] > trch_max_rate[trch]) {
                gps_req_comp[trch] = trch_max_rate[trch] ;
            }
        }
    }
    /* Now we have our basis for selecting the TFC. Score all available
     * TFCs by calculating how far they are from the modified GPS
     * result. If there are several TFCs that can send the whole GPS
     * result (or are
     * equally close) choose the one that maximises the throughput of
     * highest QoS class. Note that the TFCIs are assumed to be in
     * increasing order regarding the bandwidth usage
     */
    for(tfci = 0; tfci < MAX_TFCI; tfci++) {
        rate = score = bonus_score = 0;
        for(trch = 0; trch < MAX_TRCH; trch++) {
            int tbs = tfcs[trch] [tfci] [0] ;
            int tbss = tfcs[trch] [tfci] [1] ;
            rate += tbss;
            if (tbss < gps_req_comp[trch]) {
                score += gps_req_comp[trch] - tbss;
```

-continued

```
        } else {
            if (tbss <= queue_fill_state[trch]) {
                bonus_score += QoS_vector[trch] * (tbss -
qps_req_comp[trch]) ;
            }
        }
    }
    if(score < min_score) {
        tfc_to use = tfci;
        min_score = tfcScore;
        max_bonus_score = bonus_score;
    }
    if(score == min_score && bonus_score > max_bonus_score)
{
        tfc_to_use = tfci;
        min_score = score;
        max_bonus_score = bonus_score;
    }
}
/* Now we have chosen the TFC to use. Update the backlog and
output the
    * right TFCI
    */
    for(trch = 0; trch < MAX_TRCH; trch++) {
        tbss = tfcs[trch] [tfcToUse] [1] ;
        if (tbss < queue_fill_state) {
            if (gps_req[trch] == gps_req_comp[trch]) {
                backlog[trch] = gpsReq[trch] - tbss;
                if (backlog[trch] < 0) backlog[trch] = 0;
            } else {
                backlog[trchG1] = 0;
            }
        }
    }
    return tfc_to_use;
}
```

It will be appreciated by the person of skill in the art that various modifications may be made to the above described embodiment without departing from the scope of the present invention.

What is claimed is:

1. A method of allocating transmission resources at a Media Access Control (MAC) entity of a node of a Universal Mobile Telecommunications System (UMTS), the method comprising for each frame of an output data flow:

computing for each input flow to the MAC entity a fair share of the available output bandwidth of the MAC entity;

selecting a Transport Format Combination (TFC) from a TFC Set (TFCS) on the basis of the bandwidth share computed for the input flows, where the TFC comprises a Transport Format allocated to each input flow; and for each input flow, if the allocated TF results in a data transmission rate which is less than a determined fair distribution, adding the difference of the resulting data rate and the determined fair distribution to a backlog counter for the input flow, wherein the value of said backlog counter is taken into account when selecting a TFC for the subsequent frame of the output data flow.

2. A method according to claim 1, wherein said node at which the method is employed is a mobile station or a Radio Network Controller (RNC).

3. A method according to claim 1, wherein the input flows to the MAC entity are provided by respective Radio Link Control (RLC) entities which provide buffering for the input flows.

4. A method according to claim 1, wherein the step of computing a fair share of resources for an input flow is carried out by a Radio Resource Control (RRC) entity.

5. A method according to claim 1, wherein the step of computing a fair share of resources for an input flow comprises:

determining a weighting given to the input flow as a fraction of the sum of the weights given to all of the input flows; and multiplying the determined weighting by the total output bandwidth by the determined fraction.

6. A method according to claim 5, wherein the step of computing a fair share of resources for an input flow involves using a Generalised Processor Sharing (GPS) mechanism.

7. A method according to claim 1, wherein, in the event that the backlog counter for a given input flow has a positive value, the method comprises adding the value of the backlog counter to the computed fair share for the given input flow, and selecting a TFC on the basis of the resulting sums for each input flow.

8. A Universal Mobile Telecommunications System (UMTS) node, comprising:

a Media Access Control (MAC) entity for receiving a plurality of input data flows;

first processor means for computing for each input flow to the MAC entity a fair share of an available output bandwidth of the MAC entity and for selecting a Transport Format Combination (TFC), from a TFC Set (TFCS), on the basis of the bandwidth share computed for the input flows, where the TFC comprises a Transport Format allocated to each input flow;

second processor means for adding to a backlog counter associated with each input flow, a difference between the data transmission rate for the flow resulting from the selected TFC and a determined fair share, if the data transmission rate is less than the determined fair share, said first processor means being arranged to take into account the value of said backlog counters when selecting a TFC for the subsequent frame of the output data flow.

9. A node according to claim 8, wherein said first and second processor means are provided by a Radio Resource Control (RRC) entity.

10. A mobile telecommunications system node, comprising:

a Media Access Control (MAC) entity for receiving a plurality of input data flows, and processing circuitry configured to: (1) compute for each input flow to the MAC entity a fair share of an available output bandwidth of the MAC entity and for selecting a Transport Format Combination (TFC), from a TFC Set (TFCS), on the basis of the bandwidth share computed for the input flows, where the TFC comprises a Transport Format allocated to each input flow, (2) add to a backlog counter associated with each input flow, a difference between the data transmission rate for the flow resulting from the selected TFC and a determined fair share, if the data transmission rate is less than the determined fair share, and (3) take into account the value of the backlog counter when selecting a TFC for the subsequent frame of the output data flow.

11. A node according to claim 10, wherein the processing circuitry corresponds to a Radio Resource Control (RRC) entity.

* * * * *